G. WHEAT.
STORAGE BATTERY.
APPLICATION FILED AUG. 6, 1919.

1,389,174.

Patented Aug. 30, 1921.
2 SHEETS—SHEET 1.

INVENTOR
Grant Wheat
by Charles W. McDermott
his attorney

G. WHEAT.
STORAGE BATTERY.
APPLICATION FILED AUG. 6, 1919.

1,389,174.

Patented Aug. 30, 1921.
2 SHEETS—SHEET 2.

INVENTOR
Grant Wheat
by Charles W. McDermott
his attorney

UNITED STATES PATENT OFFICE.

GRANT WHEAT, OF MARLBORO, MASSACHUSETTS, ASSIGNOR TO KOEHLER MANUFACTURING COMPANY, OF MARLBORO, MASSACHUSETTS, A CORPORATION OF MASSACHUSETTS.

STORAGE BATTERY.

1,389,174.   Specification of Letters Patent.   Patented Aug. 30, 1921.

Application filed August 6, 1919. Serial No. 315,684.

*To all whom it may concern:*

Be it known that I, GRANT WHEAT, a citizen of the United States, residing at Marlboro, in the county of Middlesex and State of Massachusetts, have invented certain Improvements in Storage Batteries, of which the following description, in connection with the accompanying drawings, is a specification, like reference characters on the drawings indicating like parts in the several figures.

This invention relates to electric storage batteries and is concerned particularly with the light weight portable type of storage battery carried by miners for lighting an electric lamp mounted on the miner's cap, although the invention is not limited in its application to this particular type of battery.

The invention will be herein disclosed as applied to the form of apparatus illustrated in my pending application, Serial No. 101,437, filed June 3, 1916, for improvements in electric lamp lighting devices. This apparatus has proved very satisfactory in service, a particular advantage from the standpoint of the miner or other user being that the battery remains in operation and continues to light the lamp when turned into an inverted or any other position. The present invention aims particularly to improve and perfect this battery with a view to avoiding any possibility of leakage of the electrolyte, securing greater economy in the manufacture and assembling of the battery, facilitating repair, and generally improving the construction and operation of this type of apparatus.

Important features of the invention reside in the means for sealing the opening in the battery casing, a novel arrangement for sealing the battery leads in place, and in a non-spillable vent for the battery. These, and other features of the invention, will be readily understood from the following description when read in connection with the accompanying drawings and the novel features will be pointed out more particularly in the appended claims.

Referring now to the accompanying drawings.

Figure 3:
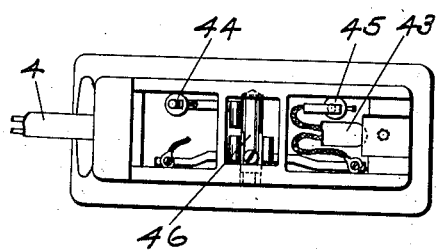
Fig. 3 is a plan view of the construction shown in Fig. 1 with the cover plate at the upper part of the casing removed.

The construction shown comprises a container or casing 2 in which the battery elements are located, and a top 3 through which the connections are made from the battery to the cable 4 containing the conductors that carry the current to the electric lamp or other device supplied by the battery.

The casing shown is provided with two compartments or cells separated by a central partition 5 and each cell contains the elements to form a battery. These elements comprise a suitable set of grids or plates 6 with their separators and an electrolyte, either acid or alkaline depending on the type of battery, in which the grids are submerged. Inasmuch as the electrolyte usually consists of an acid solution and is commonly referred to in the trade as the "acid," it will be referred to hereinafter by that term. A plurality of ribs 7 projecting upwardly from the bottom of the casing support the grids 6 and provide a mud space below them. Inasmuch as the construction is the same in each cell that of one cell only will be described.

Figure 9:
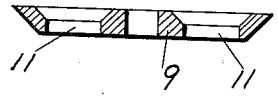
Fig. 9 is a vertical cross-sectional view of the upper cover plate.
Figure 8:
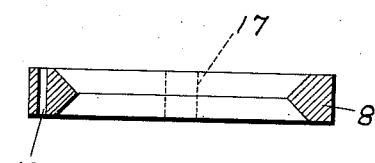
Fig. 8 is a vertical cross-sectional view of the rubber gasket used in sealing the casing.
Figure 7:
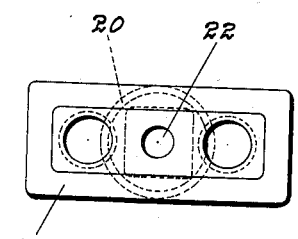
Fig. 7 is a plan view of the part shown in Fig. 6.
Figure 5:
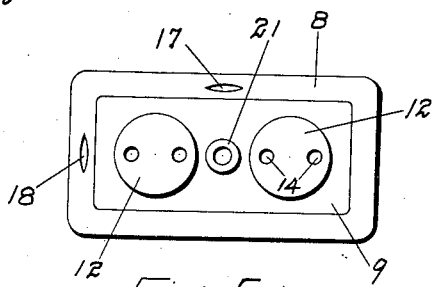
Fig. 5 is a plan view of the parts shown in Fig. 4.

The casing is open at its top and the cell preferably is of substantially uniform dimensions throughout its height so that the plates or grids can be inserted or removed through the open end. It is necessary to seal this open end securely against the leakage of the electrolyte since when the battery is in use it is frequently inverted and turned into various other positions. One of the novel features of this invention consists in the sealing means for this open end. This sealing means comprises a gasket 8, of the form best illustrated in Figs. 5 and 8, made of some yielding material, preferably soft rubber. This gasket has an outline corresponding to the outline of the opening in the casing into which it is to be placed and it is provided with inwardly tapered inner walls that fit between the margins of upper and lower cover plates designated at 9 and 10, respectively. The upper plate 9 is provided with two holes 11, Fig. 9, to receive screws 12 that pass freely through the upper plate and are threaded into sockets extending into, but not through, the lower cover plate 10. In assembling the parts the two cover plates 9 and 10 are secured loosely together by the screws 12 with the gasket 8 between the plates and these parts are then placed in their operative positions in the upper end of the cell in the casing 2. The screws 12 are then turned down tightly thus forcing the plates 9 and 10 together and causing them, through their engagement with the tapered surfaces of the gasket 8, to expand this gasket into firm engagement with the walls of the opening in the casing. The head of each screw 12 preferably is drilled, as indicated at 14, to receive a spanner wrench to facilitate the operations of tightening or loosening the screws.

Figure 14:
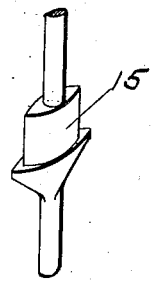
Fig. 14 is a perspective view of the electrode stem showing the shape of this part where it passes through the gasket.

Two leads or conductors 15 and 16, forming the opposite terminals of the battery, extend through holes 17 and 18 respectively, in the gasket 8. These leads preferably are elongated in horizontal cross-section at the points where they pass through the gasket, as best illustrated in Fig. 14, and they taper off to points at the opposite ends of the cross-sectional outline so that their longest dimension extends in a direction parallel to the adjacent wall of the opening in the casing. Consequently, when the cover plates 9 and 10 are forced together by threading in the screws 12, the compressive action exerted on the gasket 8 tends to squeeze the gasket tightly against the opposite walls of the conductors 15 and 16 and thus to maintain a liquid tight joint between these conductors and the gasket. This particular shape is of material assistance in maintaining this tight joint since it will readily be appreciated that if a round conductor were used the compressive action on the gasket would tend to leave small spaces between the conductor and the gasket at opposite sides of the conductor and that the acid might escape through these spaces.

A miner's electric lighting outfit, of the type above referred to, usually comprises a storage battery of the general type illustrated herein, a lamp fixed to the miner's cap and a cable connecting the electric lamp with the battery. The battery usually is strapped to a miner's belt and consequently it is tipped into various positions and the acid in the casing is continuously slopped around as the miner moves. It is necessary to provide some kind of a vent for the gas generated in the battery and it has proved very difficult to devise a satisfactory vent that would not permit the escape of the acid when the casing was inverted or turned into various other positions while in use and during which, consequently, the acid is splashed around within the casing.

Figure 10:
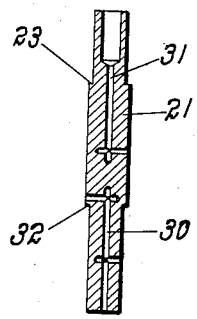
Fig. 10 is a vertical cross-sectional view of one part of the vent.
Figure 6:
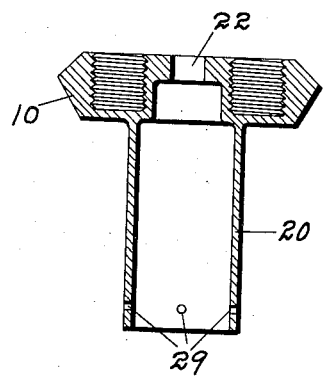
Fig. 6 is a vertical cross-sectional view of one of the cover plates shown in Fig. 4.
Figure 4:
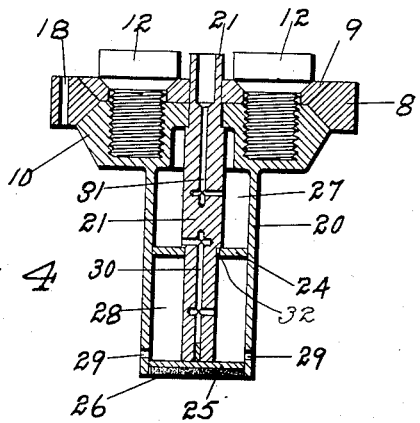
Fig. 4 is a vertical cross-sectional view through the vent device and the sealing means for the storage battery casing.

The present invention provides a very effective vent device which answers the practical requirements for this type of apparatus. This construction is best illustrated in Figs. 4, 6 and 10 from which it will be seen that the vent device comprises an outer tube 20 integral with the lower cover plate 10 and an inner tube 21 having a reduced upper end that fits snugly in a hole 22 formed in the cover plate. A shoulder 23, Fig. 10, abuts against the lower face of the cover plate 10 and determines the position of the inner tube relatively to the cover plate. A partition 24 and a disk 25 sealed into the lower end of the tube 20 by some suitable material 26 such, for instance, as sealing wax, divides the space between the tubes 20 and 21 into an upper chamber 27 and a lower chamber 28. Holes 29 are drilled through the tube 20 at its lower end and enter the bottom of the chamber 28. A tortuous passage or duct 30 in the lower part of the tube 21 leads from a point adjacent to the center of volume of the chamber 28 into the lower end of the chamber 27, and a similar duct 31 leads from approximately the center of volume of the upper chamber 27 to a point outside the casing.

The parts are so proportioned that the lower end of the tube 20 lies substantially at the center of volume of the acid receiving space in the casing, and the casing is filled with liquid to a point below the center of volume of said space. Consequently, the only openings in the tube 28 are located very close to the center of volume of the acid containing space, and it is therefore impossible for the liquid to cover any of these openings when the casing is inverted, or to cover more than one of them when the casing is in any other position. A free passage for the escape of gases thus is afforded in all positions of the battery through the holes 29, chamber 28, duct 30, chamber 27 and duct 31 to the outer atmosphere. These parts normally are cooler than the electrolyte so that any particles of acid entrained with the gas will be condensed and trapped during the travel through the vent device and such liquid obviously can drain freely back into the casing as soon as the battery is returned to its normal upright position.

If, during the time that the battery is inverted or is in some other intermediate position, it should be subjected to vigorous shaking, thus splashing the acid violently in the casing, a small amount of this acid might be splashed through the holes 29 into the chamber 28. In order, however, for this acid to escape out of the casing it will be necessary for this splashing to continue long enough to more than half fill the chamber 28 so that it could escape from this chamber into the chamber 27 and then to fill the latter chamber to such a point that it could splash into the duct 31. Such a condition obviously would never arise in the actual use of the apparatus and would only be brought about by persistent effort directed to the idea of working liquid through the vent. From an operating standpoint, therefore, this vent is non-spillable. It should be particularly noted that it comprises two traps that are in series with each other so that the liquid must travel through both traps in order to escape from the casing.

Inasmuch as the lower cover plate 10 is imperforate except for the hole through which the upper end of the tube 21 projects, and since this tube fits tightly in this hole, the liability of leaks developing through the sealing means is reduced to a minimum.

In assembling the vent device the tube 21 is forced into the cover plate 10 until the shoulder 23 brings up against the lower side of the plate. The partition 24 is then forced on to the lower end of the tube 21 until it strikes the shoulder 32. The lower end of the hole drilled in the tube 21 to form a part of the duct 30 is then plugged with some suitable material, such as sealing wax; the disk 25 is next forced into the lower end of the outer tube 20 until it abuts against the end of the inner tube 21, and the sealing wax or other material 26 is then run into place to secure the disk 25 permanently in said position. The ducts 30 and 31 in the tube 21 can conveniently be formed by drilling before the assembling operation is begun.

If desired a filling opening 34 may be formed in the side of the casing and normally closed by a screw threaded plug 35.

Figure 2:
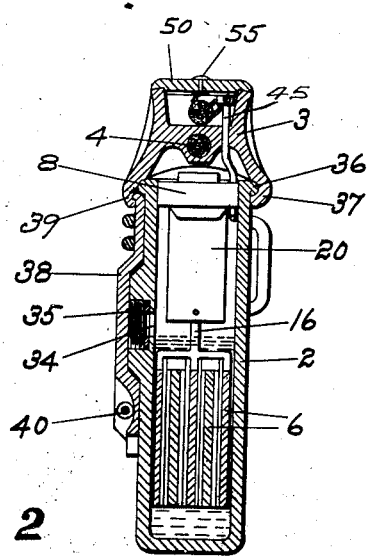
Fig. 2 is a vertical cross-sectional view of the battery shown in Fig. 1.
Figure 12:
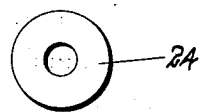
Figs. 12 and 13 are plan views of additional parts of the vent device.
Figure 11:
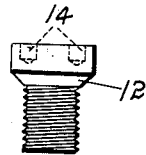
Fig. 11 is a side elevation of one of the screws used to secure the cover plates together.
Figure 13:
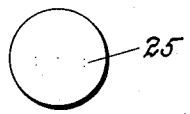

The top 3 is similar to that disclosed in my pending application, above designated, and it is held in its operative position on the casing 2 by the engagement on one side of a beading 36, Fig. 2, with a grooved portion 37 at the top, and on the other side by a cover 38 having its upper edge provided with a similar bead and engaging a part 39 on the cover similar to the part 37. This cover overlies the plug 35 for the filling opening and it is secured in its operative position by a screw projecting horizontally through a hole 30 in the cover and into a boss cast on the side of the casing 2. The parts 2, 3 and 38 may all conveniently be made of vulcanite, or some similar material, that can be molded to the desired shape and is a non-conductor of electricity.

Figure 1:
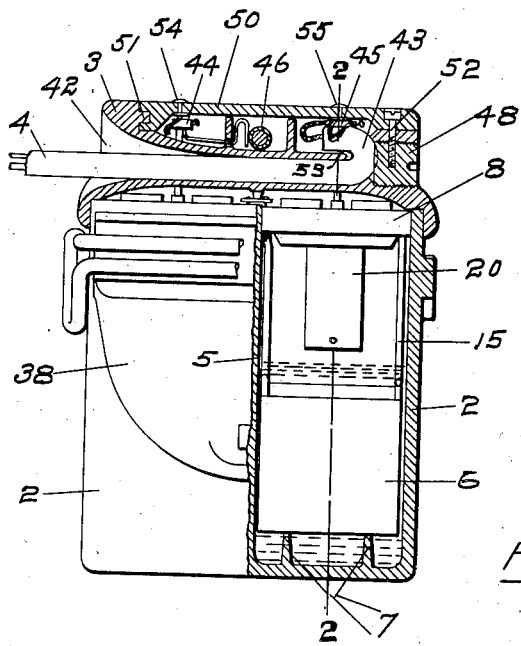
Figure 1 is a side elevation, partly in cross-section, of a battery embodying the present invention.

The top 3 is provided with a flaring opening 42 into which the cable 4 is led and the cable is turned abruptly at the inner end of the opening 42 in the manner illustrated at 43 in Fig. 1. The conductors in the cable are led to suitable binding posts 44 and 45, to which also the terminals of the battery are connected, these terminals being led through apertures formed for them in the top 3. A key operated switch 46 located in the top 3 is connected with the conductors in such a manner as to control the flow of current from the battery to the conductors in the cable 4. The two cells of the battery shown are connected in series.

In order to facilitate assembling the cable in the position shown and securing the part 43 in the position illustrated in Fig. 1, the top 3 is provided with a threaded plug 48 having holes to receive a spanner wrench, this plug being located at the inner end of the opening 42. A cover plate 50 closes the opening in which the binding posts 44 and 45 and certain of the connections leading to them and to the switch 46 are located, this plate having a dove-tail joint 51 at one end and being secured at its opposite end by a screw 52. This screw also passes into the plug 48 and secures the plug against backing out. The cable 42 is inserted in the position shown and the connections are made while the cover 50 and the plug 48 are removed. After these connections have been made the plug 48 is threaded into place where it bears against the curved part 43 of the cable and jams this cable firmly against the edge 53 around which the cable is curved.

The cover 50 also is provided with two exposed contacts 54 and 55 connected to contacts secured to the lower side of the cover in position to engage the binding posts 44 and 45. These exposed terminals are used in charging the battery to make contact with terminals leading from the source of current that is utilized in charging. The switch 46 also controls the connections between the charging terminals 54 and 55 and the battery.

What it claimed as new, is:

1. A storage battery, having, in combination a casing provided with an open end, battery elements located in said casing, and a seal for said open end comprising a yielding gasket positioned in said end, upper and lower cover plates having marginal portions bearing on said gasket, and screw threaded means for forcing said plates toward each other to expand the gasket into firm engagement with the walls of said opening, said screw threaded means extending into, but not through, said lower cover plate.

2. A storage battery, having, in combination a casing provided with an open end, battery elements located in said casing, and a seal for said open end comprising a yielding gasket positioned in said end, upper and lower cover plates having marginal portions bearing on said gasket, and screws extending through said upper cover plate into the lower cover plate and operative to force said plates toward each other to expand said gasket into firm engagement with the walls of said opening, said lower cover plate having sockets to receive said screws, which sockets extend into, but not through, said lower cover plate.

3. A storage battery, having, in combination, a casing provided with an open end, battery elements located in said casing, a yielding gasket in said opening, means for expanding said gasket into firm engagement with the walls of said opening to close the opening, and electric conductors for said battery elements extending through said gasket.

4. A storage battery, having, in combination, a casing provided with an open end, battery elements located in said casing, a yielding gasket in said opening, means for expanding said gasket into firm engagement with the walls of said opening to close the opening, and a conductor for one of said battery elements extending through said gasket, the part of said conductor that extends through said gasket being elongated in horizontal cross-section in a direction parallel to the adjacent wall of said opening and tapering substantially to a point at opposite ends of said cross-section, whereby said expanding action on the gasket will tend to maintain tight connection between the gasket and said conductor.

5. A storage battery, having, in combination, a casing provided with an open end, battery elements located in said casing, means for closing said open end, said means including a yielding gasket and means for compressing said gasket, and an electric conductor extending through said gasket, said conductor having a cross-section where it passes through said gasket enabling the compression on the gasket to maintain a tight connection between said conductor and said gasket.

6. A storage battery, having, in combination, a casing provided with an open end, battery elements in said casing, a cover plate for said opening in the casing, a gasket coöperating with said cover plate and casing to form a tight joint therebetween, and a vent device carried by said cover plate, said cover plate being imperforate except for said vent.

7. A storage battery, having, in combination, a casing, battery elements located in said casing, said elements including an acid filling less than half of the space therefor in said casing, and a vent device having a tortuous passage leading into said acid space from a point outside the casing and opening into said space only at a point or points adjacent to the center of volume of said space, whereby said vent device affords a free passage for the escape of gases in all positions of said casing.

8. A storage battery, having, in combination, a casing, battery elements located in said casing, said elements including an acid filling less than half of the space therefor in said casing, and a vent device provided with a chamber communicating with the acid space in said casing only at a point or points adjacent to the center of volume of said space, said vent device also having a passage leading from a point outside the casing and opening into said chamber near its center of volume.

9. A storage battery, having, in combination, a casing, battery elements located in said casing, said elements including an acid filling less than half of the space therefor in said casing, and a vent device provided with two chambers, one above the other, the lower chamber communicating with the acid receiving space in said casing at a point or points near the center of volume of said space, said upper chamber communicating with the outside atmosphere, and both of said chambers being in communication with each other.

10. A storage battery, having, in combination, a casing, battery elements located in said casing, said elements including an acid filling less than half of the space therefor in said casing, and a vent device comprising two tubes, one encircling the other, means dividing the space between said tubes into two chambers in communication with each other through the inner tube, said outer tube having an opening therein adjacent to the center of volume of the acid receiving space in said casing.

11. A storage battery, having, in combination, a casing, battery elements located in said casing, said elements including an acid filling less than half of the space therefor in said casing, a vent device comprising two tubes projecting into the casing, one tube encircling the other, means dividing the space between said tubes into upper and lower chambers, the lower chamber being in communication with said space adjacent to the center of volume of said space, said inner tube providing communication between the two chambers and between said upper chamber and the outside atmosphere.

12. A storage battery, having, in combination, a casing, battery elements located in said casing, said elements including an acid filling less than half of the space therefor in said casing, a vent device comprising two tubes projecting into the casing, one tube encircling the other, means dividing the space between said tubes into upper and lower chambers, the outer tube being imperforate except at its lower end, and the inner tube providing communication between the outer atmosphere and a point near the center of the upper chamber and between the bottom of the upper chamber and a point near the center of the lower chamber.

13. A storage battery, having, in combination, a casing, battery elements located in said casing, said elements including an acid filling less than half of the space therefor in said casing, and a vent device provided with two chambers and containing ducts coöperating with said chambers to form two traps in series with each other whereby gas escaping from said acid space is obliged to travel through both of said traps.

14. A storage battery, having, in combination, a casing, battery elements located in said casing, said elements including an acid filling less than half of the space therefor in said casing, and a vent device projecting into the acid containing space in said casing and provided with two traps arranged one above the other in series with each other, the upper trap being arranged to drain into the lower one and the lower trap arranged to drain into said space when the device is in an upright position.

15. A storage battery, having, in combination, a casing, battery elements located in said casing, said elements including an acid filling less than half of the space therefor in said casing, means including a cover plate for closing the opening in said casing, and a vent device comprising two tubes projecting into said casing, one tube encircling the other, the outer tube being integral with said cover plate, and means coöperating with said tubes to form therewith a trap affording a free passage for the escape of gases, but trapping liquid tending to escape therethrough when the casing is inverted.

16. A storage battery, having, in combination, a casing, battery elements located in said casing, said elements including an acid filling less than half of the space therefor in said casing, means including a cover plate for closing the opening in said casing, and a vent device comprising two tubes projecting into said casing, one tube encircling the other, the outer tube being integral with said cover plate, said inner tube projecting through said cover plate and forming a tight joint therewith, and partitions dividing the space between said tubes into upper and lower chambers, the lower chamber being in communication with the acid containing space in said casing, and said tube providing communication between said chambers and between the upper chamber and the atmosphere.

In testimony whereof I have signed my name to this specification.

GRANT WHEAT.